United States Patent [19]

Moelter et al.

[11] 4,181,275
[45] Jan. 1, 1980

[54] APPARATUS FOR OPERATING FLAP MEANS SECURED TO THE WING OF AN AIRCRAFT

[75] Inventors: Gunther Moelter, Ottobrunn; Hermann Mueller; Ruediger Kunz, both of Munich, all of Fed. Rep. of Germany

[73] Assignee: Messerschmitt-Bölkow-Blohm GmbH, Munich, Fed. Rep. of Germany

[21] Appl. No.: 909,624

[22] Filed: May 26, 1978

[30] Foreign Application Priority Data

Jun. 7, 1977 [DE] Fed. Rep. of Germany ....... 2725632

[51] Int. Cl.² .......................... B64C 9/02; B64C 9/10
[52] U.S. Cl. ..................................... 244/213; 244/215
[58] Field of Search ............... 244/213, 215, 216, 217, 244/90 R

[56] References Cited

U.S. PATENT DOCUMENTS

| 2,289,704 | 7/1942 | Grant | 244/213 |
| 3,799,474 | 3/1974 | Scharzler | 244/216 |

*Primary Examiner*—Barry L. Kelmachter
*Attorney, Agent, or Firm*—W. G. Fasse; D. F. Gould

[57] ABSTRACT

A flap such as an aileron or a landing flap is operatively secured to the rear edge of an aircraft wing in such a manner that the wing construction itself may be thin in the direction perpendicularly to the central plane of the wing and as compared to the prior art wing structures. For this purpose a coupling plate extending vertically is secured to the bottom of the flap. The coupling plate provides two journal points arranged substantially vertically one above the other. The upper journal point is connected to the wing. The lower journal point is connected to a rocker drive. A drive piston rod is connected through crank levers to rotate the coupling plate in the manner of a four journal drive.

4 Claims, 3 Drawing Figures

APPARATUS FOR OPERATING FLAP MEANS SECURED TO THE WING OF AN AIRCRAFT

BACKGROUND OF THE INVENTION

The present invention relates to an apparatus for operating flap means secured to the wing of an aircraft. Such flap means may comprise an aileron or a landing flap or air brake, preferably for high performance aircraft or aircraft having a relatively thin wing structure, whereby the drive of the flap means is accomplished through journals, lever means, and actuator means.

The prior art suggests many relevant solutions for the actuation of the flaps of an aircraft wing. Reference is, for example, made to German Patent Publication DT-OS No. 2,054,150 which discloses an aircraft wing comprising one or several gap forming flaps having one or several sections. The important feature of this known flap control is seen in that the flap or flaps may be deflected rearwardly or downwardly with the aid of a swivel or journal joint arranged below the rear section of the wing. A similar structure is disclosed in German Patent Publication No. (DT-PS) 2,047,221.

The above mentioned prior art and numerous other relevant teachings are primarily suitable for thicker wings because the actuating mechanisms of the prior art require larger spaces for accomodating these prior art mechanisms. Thus, the prior art devices are primarily suitable for commercial and transport aircraft.

OBJECTS OF THE INVENTION

In view of the above it is the aim of the invention to achieve the following objects singly or in combination:

to provide a drive and control mechanism for an aileron and/or an air brake flap which may be secured to a relatively thin wing as they are used especially on high performance aircraft;

to construct a drive mechanism of the type disclosed herein so that it will require a small volume space for its installation and which, in addition, is capable to operate or steer the flap in accordance with the rather varying or different aerodynamic conditions as they must be met in such high performance aircraft;

to construct the operating mechanism for a flap on an aircraft wing in such a manner that the gap between the rear edge of the wing and the flap opens rapidly when the flap is moved out of its normal position and that after the opening of the gap the latter retains its cross sectional area substantially unchanged;

to avoid the use of expensive sliding block drive means and to use instead a so-called four joint drive;

to provide a control mechanism which will permit a flap movement through an angle of +35° to −60° relative to a normal position of the flap which constitutes the zero degree position; and to construct the control mechanism for the flap in such a manner that the gap between the rear edge of the wing and the flap satisfies the requirements of high performance aircraft.

SUMMARY OF THE INVENTION

According to the invention there is provided an apparatus for operating an aileron or brake flap of an aircraft wherein the flap is provided with a coupling means such as a coupling plate secured to the underside of the flap. The coupling means has an edge facing toward the wing. Two swivel or journal joints are arranged one above the other in this edge of the coupling means. The upper swivel or journal joint is connected by means of a lever to a fixed swivel point within the rear edge of the wing. This fixed point is located above the upper swivel joint in the edge of the coupling means. The lower swivel or journal point in the coupling means is so arranged that it has a substantially vertically effective degree of movement freedom for the positive flap displacement downwardly whereas the lower swivel or journal point is rotatable about the upper journal point for the negative displacement of the flap in the upward direction. When the lower swivel point rotates about the upper swivel point the latter functions as a fixed point.

The kinematic drive system according to the invention has the special advantage that the gap between the rear edge of the wing and the flap opens rapidly when the flap is moved out of its normal position and that after the opening of said gap the cross sectional area of the gap remains substantially constant. For controlling the flow through the gap it is possible to provide an auxiliary flap which as such is known. The operation of actuation of the auxiliary flap may be coupled to the kinematic flap drive mechanism according to the invention.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
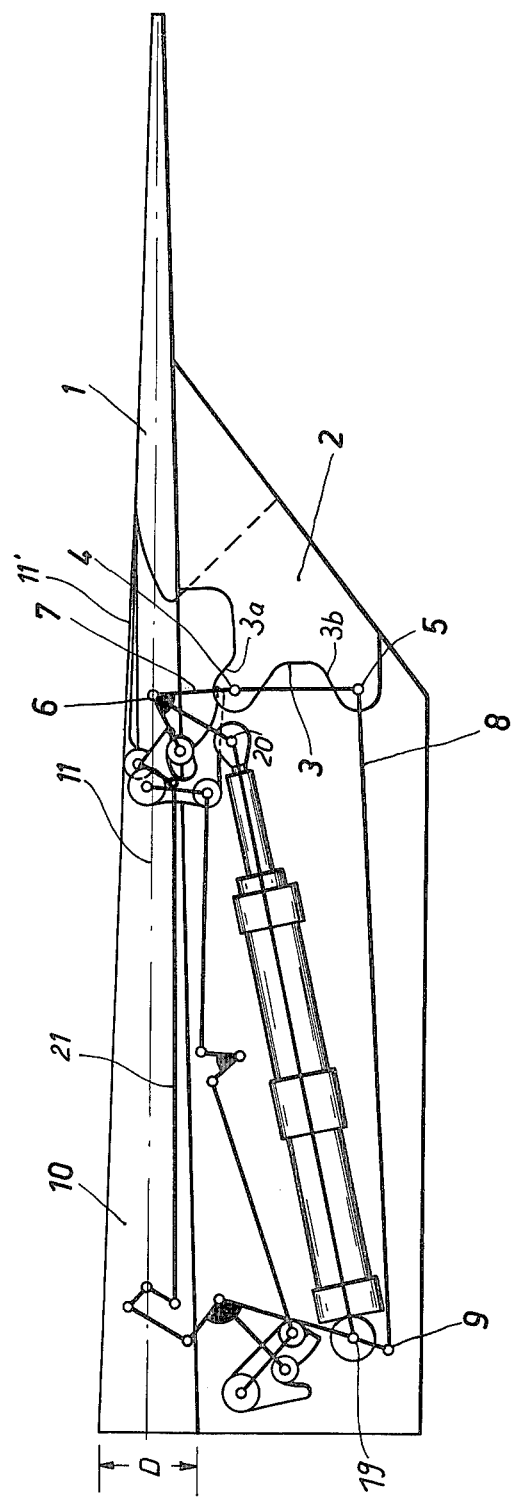
FIG. 1 is a somewhat schematic view of an apparatus according to the invention secured to the rear edge of an aircraft wing, whereby the view direction extends substantially in the longitudinal direction of the wing, wherein the flap is shown in its normal rearwardly pointing position.

Referring to FIG. 1, the flap 1 which may, for example, be an aileron or an airbrake is provided according to the invention with a downwardly extending coupling means 2 which may have the shape of a plate rigidly secured to the flap 1 by conventional means. The coupling plate 2 is provided with an edge 3 facing toward the wing 10. The edge 3 may form a recess between two extending arms of the plate 2. The upper arm 3a is provided with an upper journal or swivel point 4 and the lower arm 3b is provided with a lower swivel or journal point 5. The journal points 4 and 5 are arranged in substantial vertical alignment relative to each other.

The spacing between the journal point 4 and the wing 10 corresponds approximately to the thickness D of the wing 10. The spacing of the two journal points 4 and 5 from each other corresponds approximately to twice the thickness D of the wing 10. A fixed journal or swivel point 6 is located in the rear edge of the wing 10. The journal point 4 is connected to the fixed journal point 6 by means of a lever 7 acting as a crank. The fixed journal point 6 is located at the rear edge of the wing 10 in a position substantially defined by the intersection between the central plane 11 of the wing 10 and the upwardly directed extension of a line interconnecting the journal points 4 and 5.

The lower journal point 5 of the coupling plate 2 is connected to a rod 8 operating in the manner of a rocker arm, the opposite end of which is connected to a swivel or journal point 9, the position of which is controllable. In the position shown in FIG. 1, the point 9 is fixed. The rocker arm rod 8 is relatively long and extends substantially in parallel to the center line or plane 11 of the wing 10. By this feature the invention assures that the journal point 5 comprises a degree of freedom for movement substantially in the vertical direction. Within this freedom of motion the journal point 5 may move upwardly if the flap 1 is moved downwardly by respectively rotating the crank lever 7. As mentioned above, downward movement is considered a positive displacement of the flap 1 as shown in FIG. 2.

When the flap 1 is returned into the zero position or normal position as shown in FIG. 1 the journal point 5 returns into its starting position. On the other hand, a lever arm 13 and a roller 12 cooperate with a pawl 14 for locking the flap 1 in the position shown in FIG. 1. For this purpose the lever arm 13 is connected for journaling about the fixed journal point 6. The angular relationship between the lever 7 and the lever 13 is fixed. Similarly, the angular relationship between the lever 7' and the crank lever 7 is also fixed. Moreover, the angular relationship between the lever 7' and the lever arm 13 is also fixed. The lever arm 7' connects the free end of an actuator piston rod 18' to the lever 7 and to the lever 13 for journaling about the fixed point 6. As the roller 12 rolls up the cam truck 14' of the pawl 14, the roller 12 reaches a locked position, whereby the journal point 4 becomes a fixed point about which the journal point 5 may be rotated.

Figure 2:
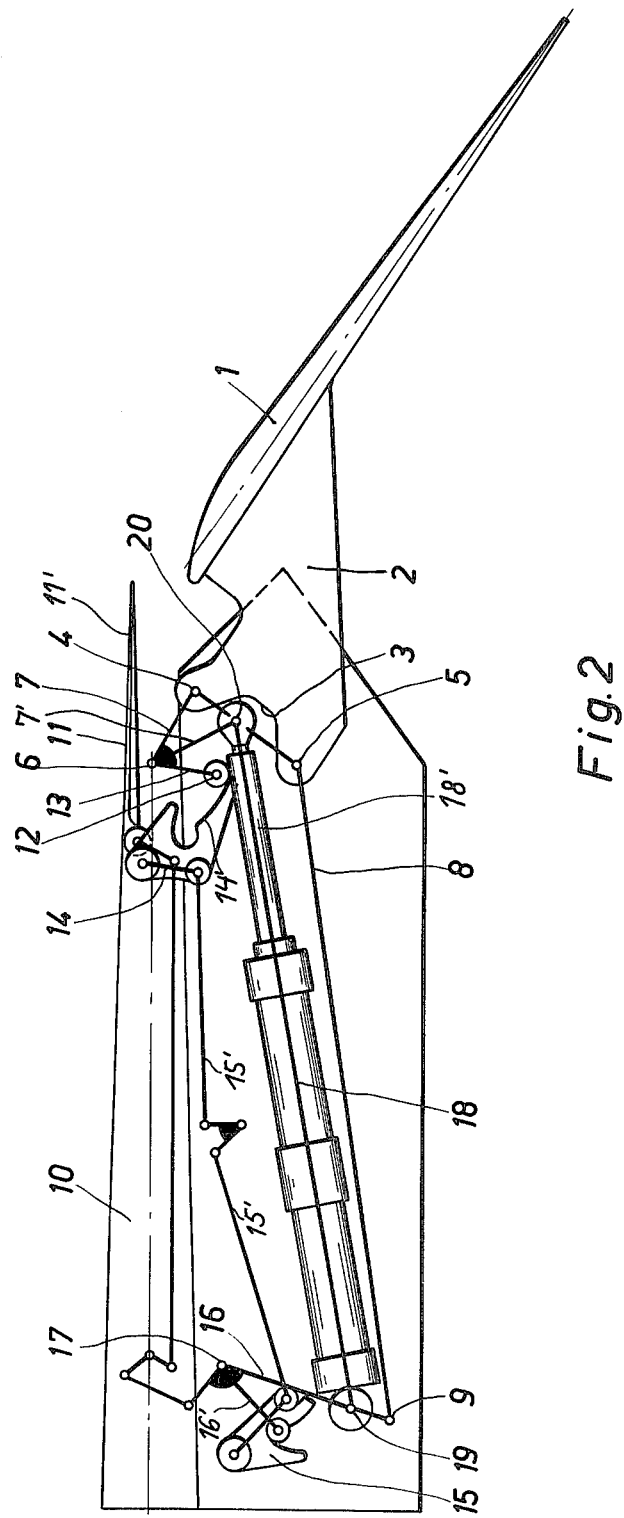
FIG. 2 is a view similar to that of FIG. 1 however the flap is shown in a downwardly displaced position which is referred to as a positive displacement.
Figure 3:
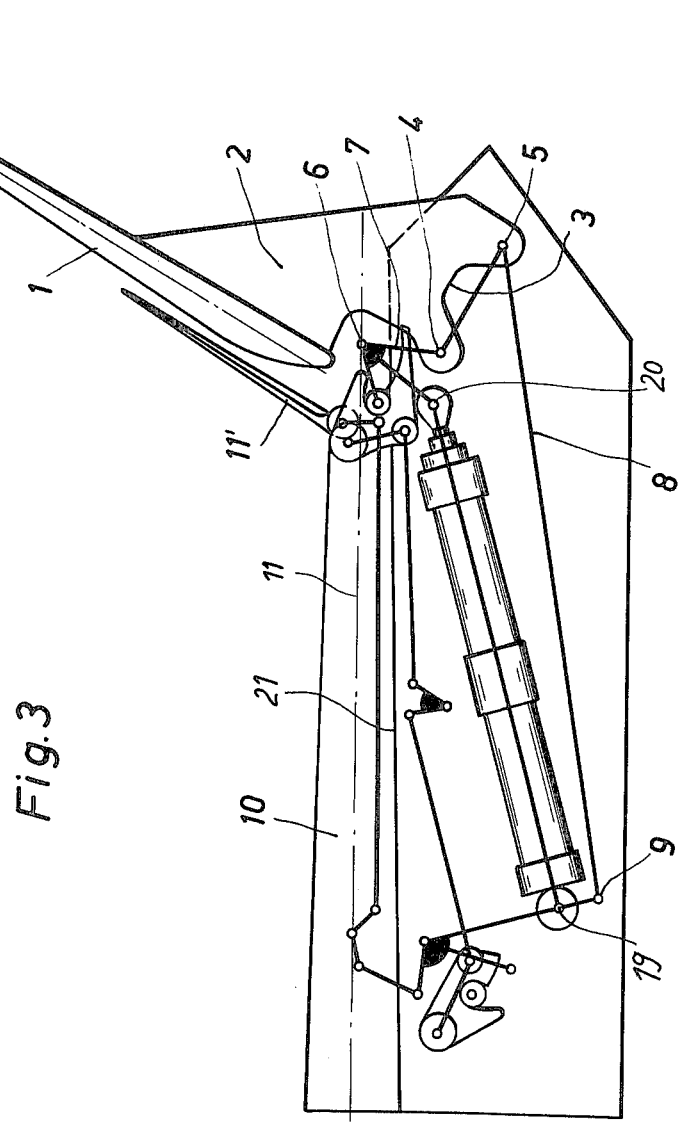
FIG. 3 is a view similar to that of FIG. 1, however, with the flap in an upwardly displaced position which is referred to as a negative displacement relative to the position shown in FIG. 1.

A further pawl 15 is operatively connected through linkage means 15' to the pawl 14, whereby the pivot or swivel point 9 may be released so that the lever 16 may rotate about the fixed point 17 as shown in FIG. 2. As a result, the flap 1 may tilt upwardly by rotation about the now fixed point 4 when the piston rod 18' of the actuator 18 is drawn into the cylinder of the actuator 18. Thus, when the flap is displaced downwardly in a positive displacement the point 19 of the actuator 18 operates as a fixed point. On the other hand, when the flap 1 is displaced upwardly in the negative direction, the point 20 of the actuator operates as a fixed point.

Incidentally, an auxiliary flap 11' is operatively hinged to the lever mechanism 21 which is connected to the lever means operating the pawls 14 and 15 so that the auxiliary flap 11' may be moved in response to the movement of the flap 1. The operating lever means for the auxiliary flap 11' are conventional.

In operation, the drive mechanism according to the invention is capable to displace the flap 1 through an angle of +35° in the downward direction and minus −60° in the upward direction relative to the zero position shown in FIG. 1. In the angle range of 0° to +35° the gap between the rear edge of the wing 10 and the flap 1 shall open rapidly in such a manner that upon reaching of an angle of +10° the gap width shall be 1.2% of the depth of the wing 10. If the flap is now tilted further downwardly to an angle of +35°, the flap 1 shall be displaced in the horizontal direction by a distance corresponding to 3% of the depth of the wing 10, whereby the gap width corresponds to about 2% of the wing depth.

The foregoing requirements have been satisfied according to the invention without the use of very expensive slide blocks. The invention assures the formation of the gap width rapidly at the beginning of the downward tilting by using a so-called four journal or swivel drive whereby the flap or aileron is linked as a coupling member between the crank lever 7 and the rocker arm or rod 8. This feature of the invention assures the rapid opening of the gap and the displacement of the flap 1 in the horizontal direction. The just mentioned so-called four point journal drive is actuated by the piston cylinder arrangement or actuator 18 and has the advantage that it is rather inexpensive in its manufacture and easy to control since it comprises only four journal or swivel joints.

The above angular range of +35° to −60° corresponds to a total angular movement of the flap within a range of 95°. Due to the coupling of the aileron or flap, the flap displacement is somewhat limited. Hence, in the range of 65° to 70° necessary for the desired gap size, the negative displacement of −60° is accomplished by tilting the flap about a single rotational or hinging point. The change-over from rotation or tilting of the flap along a coupling curve to rotation or tilting of the flap about a single rotational point is accomplished in the following manner.

When the flap 1 moves from a positive displacement toward a negative displacement through the zero position shown in FIG. 1, the crank lever 7 of the four journal coupling moves into the pawl 14 with the aid of the roller 12 secured to the lever 13. The engagement of the roller 12 with the pawl 14 which operates as a stop, locks the pawl 14, whereby the crank lever 7 and the four point joint is also arrested or blocked. The piston rod 18' is also connected to this four point journal drive structure through the lever 7' as described above. Simultaneously with the movement of the roller 12 into the pawl 14 the latter operates through the linkage means 15' the second pawl 15 which in turn releases a differential lever 16' which is normally locked during the positive flap displacement. The lever 16' is connected to the fixed journal point 17 and has a fixed angular relationship to the lever 16 which in turn is pivoted to the point 19 forming part of the cylinder of the actuator 18. The outer free end of the lever 16 forms the position controlled journal point 9 to which the rocker arm rod 8 is secured in a swivel type joint.

As the piston rod 18' continues to move into the cylinder of the actuator 18, the differential lever 16 is moved out of its zero position because the crank 7 of the four point journal drive mechanism is arrested or blocked. The rod 18 now operates as a push rod and rotates the flap 1 about the journal point 4 which in this instance acts as a fixed point since the crank lever 7 is fixed.

Furthermore, the differential lever 16 also controls the movement of the auxiliary flap 11' through the linkage 21, whereby the auxiliary flap 11' covers the gap between the rear edge of the wing and the flap 1 when the latter is tilted negatively, that is, in the upward direction.

Although the invention has been described with reference to specific example embodiments, it will be appreciated, that it is intended to cover all modifications and equivalents within the scope of the appended claims.

What is claimed is:

1. An apparatus for securing and driving flap means (1) connected to an aircraft wing (10), comprising coupling means (2) secured to said flap means (1) on the downwardly facing side of the flap means, said coupling means having an edge (3) facing toward said wing (10), a first journal point (6) secured in a fixed position to said wing (10), a second journal point (4) in a fixed position on said coupling means (2), a third journal point (5) in a fixed position on said coupling means (2), lever rod means (7) pivotally connecting said first journal point (6) to said second journal point (4) whereby a toggle joint is formed in which said second journal point is located intermediate the first and third journal points and whereby said three journal points are located substantially in vertical alignment when said flap means (1) extend substantially horizontally in alignment with said aircraft wing (1), and drive means (8,18) operatively connected to said wing and to said toggle joint for rotating the second journal point (4) relative to the first journal point (6) and for rotating the third journal point (5) relative to the second journal point (4), whereby said flap means are lifted when the second journal point (4) is maintained substantially stationary and the third journal point is rotated counterclockwise relative to said second journal point, whereas the flap means are lowered when said second journal point is rotated counterclockwise relative to said first journal point while the third journal point is rotated clockwise relative to said second journal point.

2. The apparatus of claim 1, wherein said drive means comprise rocker arm means (8) having one end journaled to said third journal point (5), position controlled swivel means (9) connected to said wing (10), said rocker arm means (8) having its other end operatively connected to said position controlled swivel means (9), whereby said rocker arm means (8) operate as a push rod when said flap means (1) are moved upwardly by rotating said third journal point (5) about said second journal point (4) in said counterclockwise direction.

3. The apparatus of claim 1 or 2, further comprising auxiliary flap means (11'), lever means (21) journaling said auxiliary flap means to said wing, and means (14) operatively responsive to movement of said flap means (1) for moving said auxiliary flap means (11').

4. The apparatus of claim 1, wherein said drive means (18) include cylinder means secured to said aircraft wing (10), and piston rod means (18') operatively connected to said lever rod means (7) at said fixed first journal point (6) whereby said lever rod means (7) are rotatable about said fixed first journal point (6) by said piston rod means (18').

* * * * *